(12) United States Patent
Burnes et al.

(10) Patent No.: US 7,514,008 B2
(45) Date of Patent: Apr. 7, 2009

(54) PROCESS CONTROL OXIDATION

(75) Inventors: Ivey Burnes, Kissimmee, FL (US); Thoram Charanda, Mount Dora, FL (US); Thomas J. Nicodemo, Clermont, FL (US); Richard Davis, St. Cloud, FL (US); Janell Crowder, Celebration, FL (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 11/459,597

(22) Filed: Jul. 24, 2006

(65) Prior Publication Data

US 2006/0254987 A1 Nov. 16, 2006

Related U.S. Application Data

(62) Division of application No. 11/173,103, filed on Jun. 30, 2005.

(60) Provisional application No. 60/586,337, filed on Jul. 7, 2004.

(51) Int. Cl.
C02F 1/70 (2006.01)
C02F 1/76 (2006.01)
C02F 1/78 (2006.01)

(52) U.S. Cl. .............. 210/746; 210/754; 210/760; 700/266

(58) Field of Classification Search ........... 210/746, 210/760, 739, 753–759, 764, 765; 700/266
See application file for complete search history.

(56) References Cited

U.S. PATENT DOCUMENTS

| 3,655,343 | A | * | 4/1972 | Galeano | ............ 422/62 |
|---|---|---|---|---|---|
| 5,043,080 | A | | 8/1991 | Cater et al. | |
| 5,273,664 | A | | 12/1993 | Schulz | |
| 5,348,664 | A | | 9/1994 | Kim et al. | |
| 5,851,407 | A | | 12/1998 | Bowman et al. | |
| 6,235,206 | B1 | | 5/2001 | Chan et al. | |
| 6,284,144 | B1 | | 9/2001 | Itzhak | |
| 6,419,831 | B2 | | 7/2002 | Wang | |
| 6,464,885 | B1 | | 10/2002 | Smith | |
| 6,474,264 | B1 | | 11/2002 | Grimberg et al. | |
| 6,556,930 | B1 | * | 4/2003 | Lueck | ............ 702/50 |
| 6,620,315 | B2 | | 9/2003 | Martin | |
| 6,623,647 | B2 | | 9/2003 | Martin | |
| 6,706,171 | B2 | | 3/2004 | Lee et al. | |
| 6,811,705 | B2 | * | 11/2004 | Puetter et al. | ............ 210/703 |
| 6,814,877 | B2 | * | 11/2004 | Gargas | ............ 210/748 |
| 2004/0112838 | A1 | | 6/2004 | Martin | |

OTHER PUBLICATIONS

Mikroelktronika, Introduction to PLC controllers, web-page, Sep. 9, 2004, 6 pages, mikroElektronika, http://www.mikroelektronika.co.vu/english/product/books/PI.Chook/chapter2/ch.

Science Engineering, PID controller, web-page, Sep. 9, 2004, Science Engineering, http://www.facto-index.com/p/pi/pid_controller.html.

(Continued)

*Primary Examiner*—Matthew O Savage
(74) *Attorney, Agent, or Firm*—Greenberg Traurig, LLP

(57) ABSTRACT

The present disclosure provides for a system and method that intensely oxidizes water as it navigates through a system and accurately, controllably neutralizes the oxidation by-products before the water exits the system.

15 Claims, 7 Drawing Sheets

OTHER PUBLICATIONS

Axel Daneels, Wayne Salter, IT/CO, What is SCADA?, web-page, Sep. 9, 2004, CERN-CNL-2000-003 vol. xxxv, Issue No. 3, 11 pages, http://www.ref.web.cern.ch/ref/CERN/CNL/2000/003/sc.

Mikroelektronika, Introduction to PLC controllers, web-page, Sep. 9, 2004, 4 pages, chapter 1, mikroElektronika, http://www.mikroelektronika.co.uv/enlgish/product/books/PI.Choo.

Trevor V. Suslow, Ph.D., Using Oxidation Reduction Potential (ORP) for Water Disinfenction Monitoring, Control and Documentation, research document, Oct. 2004, 4 pages, Dept. of.

Robert W. Lowry & David Dickman, The ABCs of ORP—Clearing up some of the mystery of Oxidation-Reduction Potential, web-page, 5 pages, Sep. 9, 2004, http://www.rhtubs.com/ORP.h.

* cited by examiner

PROCESS CONTROL OXIDATION

RELATED APPLICATIONS

This application is a divisional of U.S. application Ser. No. 11/173,103, filed Jun. 30, 2005, claiming the benefit of and priority to U.S. Provisional Application Ser. No. 60/586,337, filed Jul. 7, 2004, the contents of all of which are incorporated by reference herein in their entirety.

BACKGROUND

1. Field

The present disclosure generally relates to accurate and specific control of water oxidation reduction potentials, and more particularly to systems, methods and apparatus for safe and effective water sanitation and treatment.

2. General Background

Various methods and apparatus have been utilized in order to treat/sanitize water. For example, the use of oxidants such as gaseous ozone for disinfection is well known. Typically, retention chambers are utilized into which ozone is introduced to water contained therein. Oxidation-reduction reactions then take place between the introduced ozone and contaminants in the water, where the oxidants are reduced and contaminants in the water are oxidized. Various oxidants are well known in the water treatment arts, such as bromine and chlorine, for example.

A common problem with such prior art systems is the reliance on less than accurate/controllable methods for monitoring and controlling the amount of residual oxidant (e.g. ozone) retained in water after introduction of the oxidant into water to be treated. Another troublesome aspect is the production of various radicals and side reactions that result in residual oxidizing species. Various methodologies have been employed to control oxidant-contaminant reactions. One prior art method utilizes multiple chambers to allow the introduction of an oxidant, ozone, to break down and oxidize contaminants, the remaining ozone then dissipating into oxygen. In such a system, a main component is time. That is, there is a passive reliance on the inherent breakdown of the oxidant introduced into the system. Additionally, when an oxidant is introduced at a consistent rate or amount into a process stream of water to be treated, fluctuations in the amount of contaminants in the water to be treated greatly affects the reaction dynamics between the introduced oxidant and the contaminant. Reductions in the amount of contaminants, or those compounds to be oxidized in a process stream, without an accurate and concordant reduction of introduced oxidant will lead to unacceptably high concentrations of residual oxidants in the process stream.

This typically leads to introduction of an oxidant at unacceptable levels into a water system or water source. This is particularly an issue when the destination of this treated water includes/supports various life forms that will be adversely affected by the introduction of treated water having unacceptably high concentrations of residual oxidants. Inaccurate prior art chemical methods for neutralizing oxidants introduced to sanitize water typically result in unwanted chemical reactions that can be detrimental, particularly when water in which such reactions are introduced into an aquatic ecosystem.

Other prior art methodologies include technology utilizing oxidation reduction potential monitoring for controlling oxidant feed. Typically these methods regulate oxidant feed based on how the oxidant is consumed, reacting with target substances/contaminants and unwanted organisms, within a system. As an example, a typical prior art method for treating water utilizes dissolved ozone as an oxidant and hydrogen peroxide to decompose remaining ozone concentrations left after the passage of a set amount of time. The addition of peroxide merely creates a less stable and more reactive oxidant that is less likely to persist. Allowing for the natural decay of the oxidant presents some major limitations to these technologies.

One limitation of the prior art is the fact that the rate of oxidant feed is limited by the demand and ability of the target system to remove it. This often prevents one from being able to dose an oxidant at high enough rates and/or concentrations to effect complete sterilization/sanitation. For example, Cryptosporidium is a significant health hazard for humans that can cause life threatening diarrhea. This pathogen is highly resistant to all but very high oxidant concentrations, concentrations that may not be obtainable utilizing prior art methods due to the inability of such methods to effectively neutralize the high concentration of the oxidant in a useful manner. In the case of lagoons, reefs, or any sensitive ecosystem into which such treated water is introduced, the release of even the smallest amounts of oxidant is potentially life threatening to flora and fauna residing therein.

Hydrogen peroxide is a weak acid that is partially dissociated in water, based on the pH, into its hydroperoxide ion.

An equilibrium equation is, $H_2O_2 + H_2O \rightleftharpoons HO_2^- + H_3O^+$, $pK_a = 11.6$ The hydrogen peroxide molecule itself reacts very slowly with ozone, conversely the hydroperoxide ion reacts very quickly. The actual reaction profile is very complex with the formation of multiple types of free radicals including the production of hydroxide radicals. It is through the production of these radicals, from the combination of ozone and hydrogen peroxide, that provides for the techniques of prior art advanced oxidation processes for a variety of water remediation challenges. The mechanism of ozone decomposition, initiation and propagation reactions are proposed as follows (Ozone in Water Treatment: Application and Engineering, 1991):

$$H_2O_2 + H_2O \rightleftharpoons HO_2^- + H_3O^+$$

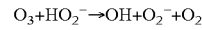

$$O_3 + HO_2^- \rightarrow OH + O_2^- + O_2$$

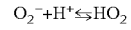

$$O_2^- + H^+ \rightleftharpoons HO_2$$

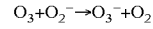

$$O_3 + O_2^- \rightarrow O_3^- + O_2$$

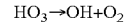

$$HO_3 \rightarrow OH + O_2$$

As can be seen from the equations above, the actual decomposition of ozone by hydrogen peroxide is fairly complex and includes the production of hydroxide and superoxide radicals. The products of these reactions will provide for further oxidation of oxidizable organics and/or inorganics.

As can be seen from the above equations, the use and addition of hydrogen peroxide into a process stream to control or neutralize dissolved residual ozone will decompose ozone molecules, but in the process create unwanted free radical residuals along with some remaining unreacted hydrogen peroxide that will contribute to elevated oxidation reduction potentials of water in a treated effluent stream. Such reaction remnants are highly undesirable and indeed may be detrimental to flora and fauna that reside in water into which such treated effluent streams may be introduced.

An amusement park aquarium system is an example where accurate control of a process stream of water is required and unwanted free radical residuals along with unreacted hydrogen peroxide, are not desired. Amusement park aquarium systems typically house substantially synthetic seawater. These systems can be quite large, holding and maintaining millions of gallons of seawater. These systems are typically closed in that no water is added or removed except through evaporation and slight operation losses. Seawater in aquatic displays typically supports various aquatic life forms. As such, the water contained therein receives significant waste products/contaminants from marine mammals and fish that reside therein, in addition to the various plant, color bodies and other contaminants typically found in such displays.

Excess waste products result in organic build up and color bodies that render waters in such displays uninhabitable. The buildup also limits visibility to patrons visiting the aquarium. For example, seawater in such aquariums take on a significant green/yellow cast that limits visibility and gives the aquarium an unhealthy and unnatural appearance.

Unfortunately, in prior art systems, the rate of oxidation is traditionally limited by the susceptibility of the resident aquatic species to tolerate byproducts produced by the oxidation reactions, such as hypobromous acid. Often the animals housed in these aquatic habitats are very sensitive to, and easily damaged by even slight residual amounts of ozone, chlorine, bromine, or other halogens. There are times when marginally acceptable water quality often takes precedent over increased oxidation treatments due to animal health concerns. Oxidation treatments would be effective at treating color and waste concerns, but the necessary dosing required would likely lead to harm the surrounding environment and animals residing therein.

There exist treatment systems for neutralizing oxidizing agents by delivering neutralizing and converting chemicals like sulfur dioxide, sodium thiosulphate and ascorbic acid. However, these systems are used almost exclusively with chlorine. Traditionally, the conversion chemicals are "dumped" wholesale into a process stream to completely erase any oxidative potential and there is no regulation of oxidative potential. These systems are typically used to de-chlorinate water before the water is released into surface water systems. The method of conversion is crude, largely uncontrolled, and potentially releases significant amounts of unreacted neutralizing chemicals into the environment. In a closed system such as a commercial aquarium, the unreacted neutralizing chemicals can cycle back through a process stream and deactivate oxidizing agents that are introduced and before they react with the target contaminants and harmful waste products. The uncontrolled release of the neutralizing chemicals also results in incomplete conversion of the oxidizing agents or harmful chemicals to safe compounds, which results in harm to the surrounding environment.

Water treatment systems utilized in other applications also experience similar problems. For example, watercrafts, such as cruise ships, must also disinfect discharge waters that are dumped into the ocean. Discharge waters are typically substantially made up of grey and/or black water that is generated onboard the watercraft. Grey water is typically used water from showers, sinks or basins, including used kitchen water. Black water is water contaminated with human waste, collected from shipboard toilets. Under various national and international standards, black water must be treated before being discharged from a vessel. During water treatment, undesirable by-products and unreacted oxidants discharged by these watercraft harm the environment and bodies of water in which these vehicles travel. In some cases, typically depending upon the types of water treatment system employed onboard and/or the location of the vessel, the watercraft are not allowed to discharge treated water into surrounding natural bodies of water. Often, watercraft must store the grey and/or black water generated onboard and transfer such water to a water treatment system located off board.

SUMMARY

In one aspect, the present disclosure provides for a system, apparatus and method that intensely oxidizes and treats water as it navigates through a filtration system and further neutralizes oxidant and oxidation by-products before the water exits the system.

One aspect of this system and method of process control oxidation is capable of sequestering a typical filtration stream and disinfecting the stream without impacting sensitive animals in a habitat for which water is treated. This is accomplished through precise regulation of oxidation and subsequent neutralization of unreacted oxidants and undesirable by-products. The technique utilizes precise regulation, by computers, of a process stream where oxidation values, represented by oxidation reduction potential (ORP), are manipulated.

In another aspect, the system comprises a process where high levels of oxidizing agents are delivered into a process stream to affect disinfection. The oxidizing agents are subsequently converted to harmless compounds. This process is computer controlled using oxidant dispensers, such as ozone generators, chlorine pumps, or other similar devices. The output rate of the oxidizing agent is varied to correlate with target set points as measured by oxidation state probes.

In particular embodiments, subsequent neutralization or conversion of the process stream is completed before the process stream is returned to a main water supply or water source, from which the process stream originates. This stage in the process is regulated by computer controlled injection of a neutralizing chemical. The output rate of the neutralizing chemical is varied to correlate with a target set point as measured by oxidation state probes. While there are devices that provide oxidant feed based on oxidation-reduction potential or demand, the present system has the ability to reduce oxidation-reduction potential to a specific target value, once desired disinfection is accomplished. In particular embodiments, a target value can be a value that still provides the treated water with a oxidation-reduction potential that is capable of reducing contaminants (e.g. an oxidation-reduction potential greater than zero).

In one embodiment, a water treatment apparatus is provided that comprises a conduit, from a water source, defining a flow path containing water from the water source. This conduit is in communication with the water source and a water treatment system. The system includes a first oxidation reduction potential determining point having at least one sensor for measuring a first oxidation reduction potential of water from the water source. The at least one first sensor is in communication with a master controller. An oxidant injection controller, in communication with an oxidant dispenser, is also provided and is in communication with the master controller. An oxidant dispenser, in communication with the flow path, dispenses at least one oxidant at an oxidant injection point along the flow path and into the water, is also provided. The conduit includes a first mixing portion of the flow path for mixing injected oxidant with water from the water source in order to establish and provide a first target oxidation reduction potential. At a second point of the conduit, at least a second sensor is provided and is also in communication with the master controller. The second sensor measures a second oxidation reduction potential, and the second sensor is located downstream from the first mixing portion. A neutralizing chemical dispenser is also provided and is located downstream of the oxidant injection point. A neutralizing chemical injection controller, also in communication with the master controller and the neutralizing chemical dispenser, dispenses at least one neutralizing agent via a neutralizing chemical injection point along the flow path. A second mixing portion of the flow path is provided for mixing water emanating from the first mixing portion with the at least one neutralizing agent. This mixing establishes and provides a second target oxidation reduction potential in the water in the flow path. The flow path includes a water return portion for conducting water from the second mixing portion back to the water source.

In particular embodiments, the oxidant dispenser and the neutralizing chemical dispenser dispense their respective contents into the flow path, containing water, at computer-controlled rates that are correlated to and establish the desired first target oxidation reduction potential and the second target oxidation reduction potential, obtained and measured in real-time.

In particular embodiments, the water's first oxidation reduction potential (as it is obtained from the water source) is less than the first target oxidation reduction potential. The first target oxidation reduction potential is typically a sanitizing oxidation reduction potential that is predetermined and established in accordance with the particular application of the teachings of the present disclosure.

In some embodiments, various configurations of the conduit are contemplated to provide desired mixing characteristics of the various mixing portions. In one embodiment, mixing portions include venturi arrangement of conduits, for example.

Various useful compounds are contemplated, in accordance with the present disclosure. In particular embodiments, at least one oxidant is introduced into water of the flow path. In some embodiments, the at least one oxidant is combined with at least one additional oxidant. Exemplary oxidants include ozone, bromine, chlorine, fluorine and iodine. Various neutralizing chemicals/compounds can be utilized in various embodiments. For example, the at least one neutralizing chemical can be a thiosulfate-containing compound, such as sodium thiosulfate, for example.

Additionally and in some embodiments, a combination of neutralizing chemicals can be utilized. For example, the thiosulfate compound may be combined with at least one additional neutralizing chemical such as, but not limited to, sodium sulfite, ascorbic acid, or hydrogen sulfite or any combination thereof. In other embodiments, sodium sulfite, ascorbic acid and hydrogen sulfite can be utilized alone or in any useful combination.

Exemplary first target oxidation reduction potentials are about two to about four times higher than the first oxidation reduction potential of the water taken from the water source, but may range from about 1.1 to 10 times higher. For example, the first target oxidation reduction potential is a sanitizing oxidation reduction potential that is utilized and known to sanitize water to a desired degree. Exemplary first target oxidation reduction potentials can be about two to four times greater than the first oxidation reduction potential of the water when taken from the water source. As such, the second target oxidation reduction potential that is established upon addition of the at least one neutralizing chemical is typically less/a lower value than the first target oxidation reduction potential that is established upon addition of at least one oxidant.

The teachings of the present disclosure also provide water treatment apparatus, systems and methods wherein the second target oxidation reduction potential is reduced to about 50 to about 80 percent of the first target oxidation reduction potential established after addition of the at least one oxidant to water in the flow path. In some embodiments, the flow path includes a filter for filtering particulates out of the water obtained from the water source. In still other embodiments, at least one qualitative sensor is provided along the flow path. An exemplary qualitative sensor detects a color and/or color level/intensity and/or turbidity which correlates to a contamination level of water being analyzed by the at least one sensor, such a qualitative sensor.

Particular embodiments include a conduit portion for conducting treated/sanitized water back to the water source, where water flowing from the second mixing portion contains a desired target amount/level of residual oxidant (and hence has a particular oxidation reduction potential) that does not substantially change the overall average oxidation reduction potential of water in said water source. In still other embodiments, water emanating from the second mixing portion contains substantially no residual oxidant or other oxidative radicals resulting from injection the at least one oxidant into water in the flow path.

In one aspect, water emanating from the second mixing portion has an oxidation reduction potential between about 550 mV to about 700 mV. In other examples, the oxidation reduction potential can be between about 570 mV to about 625 mV or from between about 580 mV to about 610 mV.

In some embodiments, a portion of the injected at least one oxidant remains unreduced by contaminating reducing agents located in water from the water source. This portion of unreduced at least one oxidant is then reduced by interaction with the at least one neutralizing chemical at the second mixing portion of said flow path. The at least one neutralizing chemical is injected in a sufficient amount in order to achieve the second target oxidation reduction potential.

Particular embodiments utilize various types of controllers to dispense the at least one oxidant and at least one neutralizing chemical into the flow path of water in the conduit. For example, some embodiments utilize an oxidant injection controller that is a programmable logic controller. This can be combined with the use of a neutralizing chemical injection controller that is also a programmable logic controller. In one embodiment, such programmable logic controllers include a proportional integral derivative loop.

Some embodiments employ a second mixing portion of the flow path that contains a reaction that proceeds in accordance with the chemical formula:

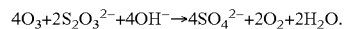

$$4O_3 + 2S_2O_3^{2-} + 4OH^- \rightarrow 4SO_4^{2-} + 2O_2 + 2H_2O.$$

In another aspect, the present disclosure also provides a method for water treatment. Particular embodiments include the steps of providing a conduit for conducting water from a water source and thereby obtaining an amount of water from the water source. This amount of water, to be treated from said water source, has an oxidation reduction potential. After determining a first oxidation reduction potential of the water, the water is conducted to at least one oxidant injection point where the step of introducing an effective amount of at least one oxidant to the water takes place. A second oxidation reduction potential is measured, wherein the second oxidation reduction potential is greater than the first oxidation reduction potential and the second oxidation reduction potential is a predetermined sanitizing target oxidation reduction potential. This predetermined sanitizing target oxidation reduction potential is achieved by introduction of the effective amount of the at least one oxidant and allowing for a first oxidation-reduction reaction to occur. This first oxidation reduction reaction proceeds between the introduced at least one oxidant and at least one contaminant in the water. A further step is provided where a measurement of a third oxidation reduction potential of the water, after allowing a predetermined amount of time to pass following commencement of the a first oxidation-reduction reaction, is taken. Afterwards, a step of introducing an effective amount of at least one neutralizing chemical into the water is executed, the effective amount being based upon the measured third oxidation reduction potential and a target effluent oxidation reduction potential and allowing for a second oxidation reduction reaction to take place in the water. The second oxidation reduction reaction proceeds substantially between remaining amounts of the at least one oxidant and the at least one neutralizing chemical. A target effluent oxidation reduction potential is then established in the water, and the resultant treated water, now having the target effluent oxidation reduction potential, is then distributed.

In accordance with the present disclosure, water to be treated by the apparatus, systems and methods disclosed herein can originate from at least one of a plethora of sources. Exemplary water sources, include a sea, a lake, a stream, an ocean, a storage tank, an aquarium, a swimming pool, a fountain, a river, a contaminated spill area, a delta, a swamp, a pond, a channel, a sewer, a canal, a food processing station, water park or an agricultural harvesting or processing location or any combination thereof.

In accordance with particular embodiments, methods disclosed herein can further comprise a step of filtering water before and/or during and/or after treatment, in addition to exposing the water to the various chemical based sanitation protocols provided herein. Where computer control is utilized, various embodiments can further include steps of entering the predetermined sanitizing target oxidation reduction potential value and/or target effluent oxidation reduction potential value into a master controller, which can be a computer or a network of computers.

Various methods disclosed herein utilize ozone as the at least one oxidant. In some embodiments, the at least one oxidant is combined with at least one additional oxidant. Exemplary additional oxidants to be added to ozone, for example, are selected from the group consisting of bromine, chlorine, hydrogen peroxide and potassium monopersulfate. In other embodiments the at least one oxidant is selected from the group consisting of ozone, bromine and chlorine. Various methods disclosed herein utilize sodium thiosulfate as the at least one neutralizing chemical. Exemplarily, the at least one neutralizing chemical can be combined with at least one additional neutralizing chemical selected from the group consisting of sodium sulfite, ascorbic acid and hydrogen sulfite. In still other embodiments, the at least one neutralizing chemical is selected from the group consisting of sodium thiosulfate, sodium sulfite, ascorbic acid and hydrogen sulfite or any combination thereof.

Particular embodiments treat water that originates from various sources. Some embodiments include grey water and/or black water. Such water is typically generated onboard a watercraft, and at least one of gray and/or black water comprises the water source from which water is to be treated. In another aspect, water to be treated may come from water collected from at least one food processing station. Such water is typically utilized to wash at least one food item at the at least one food processing station. Large volumes of water that are to be treated may originate from post-harvesting activities, for example during handling and processing of fruits and vegetables.

In some embodiments, a washing step results in water contamination with at least one natural bodily fluid or at least one bodily secretion. Such contamination can take place at meat processing centers, for example, such as slaughterhouses and/or meat packaging plants. In such cases, the at least one natural bodily fluid comprises any single or combination of blood and/or intracellular fluid and/or interstitial fluids. In some instances, the at least one bodily secretion includes at least one or a combination of urine, saliva, feces, or semen, for example.

In some embodiments, a process control oxidation water treatment system is provided that includes a water source located at a primary holding area with a main line in communication with the water source. The main line includes a main line injection point adjacent and upstream from a secondary holding area inlet. A set distance is provided between the main line injection point and the secondary holding area inlet. A process stream is provided and flows through the main line. The secondary holding area is provided with a secondary holding area inlet and a secondary holding area outlet. An oxidant dispenser, which delivers an oxidant into the process stream at the main line injection point, is also provided. The injected oxidant raises the oxidation reduction potential in the process stream and initiates a first reaction between the injected oxidant and contaminants within the process stream. Subsequently, a neutralizing chemical is injected into the secondary holding area, to which the water passes, and a second reaction between the neutralizing chemical and the oxidant and by-products of the first reaction takes place, lowering the oxidation-reduction potential of the process stream. Such lowering brings the oxidation reduction potential to a predetermined target oxidation reduction potential, such as a non-zero oxidation reduction potential.

In particular embodiments, at least one oxidation state probe is provided in or adjacent to the secondary holding area inlet to monitor oxidation-reduction potential of the water to which the at least one oxidant is added. A computer, having a target oxidation reduction potential set point and in communication with the oxidation state probe is also provided, along with a proportional-integral-derivative (PID) controller or other appropriate controller, in communication with the computer. The PID varies an injection rate of the oxidant into the process stream, based on the target oxidation-reduction potential set point.

Particular embodiments further includes another oxidation state probe, located adjacent or in the secondary holding area outlet to monitor the oxidation reduction potential, and the computer contains a second target oxidation-reduction potential set point connected to the oxidation state probe located adjacent, or in, the secondary holding area outlet. A second PID controller is connected to the computer to vary an injection rate of the neutralizing chemical into the secondary holding area.

In particular embodiments, the process stream originates from a water supply, subsequently flows through a main line/conduit, and is sanitized to form a sanitized process stream. This sanitized process stream is then returned to the water supply from which the process stream originated. In some embodiments, an oxidation state probe can be located in the water supply to monitor the process control oxidation water treatment system in an overall fashion, utilizing the oxidation reduction potential reading/level of the water supply as one indication show that the water treatment system is operating properly and within desired limits.

In some configurations, various embodiments provide a water treatment system and associated method that includes a secondary holding area outlet that further comprises an aeration tower and/or a discharge pipe.

As before, various embodiments utilize various water sources. Non-limiting examples include a sea, a lake, a stream, an ocean, a storage tank, an aquarium, a swimming pool, a fountain, a river, a contaminated spill area, a delta, a swamp, a pond, channel, canal, food processing or handling stations or any combination of water from such sources.

In particular embodiments, water to be treated that forms a process stream from a water source contains at least one contaminant or combination of contaminants. Exemplary at least one contaminant or combination of contaminants include, but are not limited to, at least one or any combination of color bodies, bacteria, viruses, fungi, natural bodily fluid of an organism or bodily secretion of an organism, for example. As an example, the at least one contaminant or combination of contaminants can originate or be introduced into the water to be treated from a food processing/handling station.

The various embodiments disclosed herein can treat water containing at least in part one of black or grey water, which can be produced onboard a watercraft, for example. In other embodiments, such black and/or grey water can originate and be generated from dwellings located on land (e.g., houses, office buildings, etc. . . . ).

In still another embodiment for treating water, a process stream of water from a water source is established and a first oxidation reduction potential is measured at a first measurement point. This measurement is conducted via at least one oxidation state probe in contact with water in the process stream of water from said water source, to which at least one oxidant is introduced at an oxidant introduction point. Subsequently, a second oxidation reduction potential is measured at a second measurement point downstream of the oxidant introduction point.

The introduction of the at least one oxidant provides for a first reaction between the at least one oxidant and contaminants within said process stream. In another step, a third oxidation reduction potential is measured at a third determining point at or proximate to a treated process stream outlet and downstream from the first and second determination points.

At least one neutralizing chemical is introduced into the process stream at a point downstream from the oxidant introduction point and before the treated process stream outlet, thereby providing a second reaction between the at least one neutralizing chemical and any remaining amounts of said at least one oxidant. As a result, a treated process stream target oxidation reduction potential set point of said process stream is achieved.

In one embodiment, a step of inputting information relating to a sanitizing oxidation reduction potential set point into a computer is provided. The sanitizing oxidation reduction potential set point determines, at least in part, a rate and/or amount of the at least one oxidizing agent is introduced into the process stream in order to establish the sanitizing oxidation reduction potential set point in the process stream.

A further embodiment includes the step of inputting information relating to a treated process stream oxidation reduction potential set point into a computer, said treated process stream oxidation reduction potential set point determining, at least in part, a rate at which said at least one neutralizing chemical is introduced into said process stream. If so desired, a filtering step is also provided whereby the process stream of water passes through at least one filter disposed at a position between the water source and the treated process stream outlet.

In particular embodiments, water treatment methods and apparatus are utilized in a closed circulating water system. Other embodiments utilize water drawn from a water source, such as a natural body of water, and pass it through the apparatus, system and subject the water to the method steps disclosed herein, and return it to the natural body of water. In some embodiments, the second oxidation reduction potential established via introduction of at least one oxidant is about two to about four times higher than a first oxidation reduction potential measurement of water as it is taken from the water source. In various embodiments a target oxidation reduction potential of a treated process flow is reduced from about 0.5 to 0.8 times the second oxidation reduction potential. In some embodiments, the natural body of water is a marine or freshwater body of water. In particular embodiments, the water source is an aquatic display that contains at least one aquatic life form. For example, life forms (i.e. flora and fauna) can include any one or combination of, but are not limited to, members of the Chordata, Echinodermata, Arthropoda, Mollusca, Cnidaria, Porifera, Angiospermophyta phyla.

In embodiments associated with an aquatic display having aquatic life forms contained therein, the final target oxidation reduction potential of the treated process flow returning to the aquatic display is a value (oxidation reduction potential value) that corresponds to an innocuous oxidation reduction potential, such that the at least one aquatic life form is not adversely affected as a result of introducing the treated process flow into the aquatic display. This is achieved in part by the step of introducing the at least one neutralizing chemical into the processing stream. In particular embodiments, the amount of the at least one neutralizing chemical is such that substantially no residual levels of an at least one oxidizing agent remains in the treated process flow, or oxidant levels are such that they are innocuous to the aquatic life form living in water into which the treated process flow is introduced.

In various embodiments, such precision is achieved by utilizing a computer in communication with a controller, such as, but not limited to, at least one proportional integral derivative controller that varies rates of introduction, in real-time, of the at least one oxidant and the least one neutralizing chemical into the processing stream. An exemplary second reaction proceeds in accordance with $4O_3 + 2S_2O_3^{2-} + 4OH^- \rightarrow 4SO_4^{2-} + 2O_2 + 2H_2O$, wherein ozone is the least one oxidant and a thiosulfate compound is the least one neutralizing chemical introduced into the process stream to give rise to the treated process flow.

The present disclosure also provides a method for treating water where a circulating water treatment system is provided. A main water source and a water treatment portion are provided. Water from the main water source is conducted to the water treatment portion, the conduction establishing a process stream and a first oxidation reduction potential of water from said main water source is measured.

A first oxidation reduction potential target set point is inputted into a computer, the first oxidation reduction potential target set point being a sanitizing oxidation reduction potential level which corresponds to an introduced effective amount of least one oxidant into the process stream. The effective amount is sufficient to raise the first oxidation reduction potential to the first oxidation reduction potential target set point. A first portion of the circulating water treatment system is provided for mixing of the introduced effective amount of at least one oxidant with water in the process stream, thereby allowing a first reaction to proceed between the effective amount of the at least one oxidant and contaminants in the process stream, in order to sanitize said process stream.

A second oxidation reduction potential is then measured, downstream of the first portion of the circulating water treatment system. The computer also has a second oxidation reduction potential target set point inputted into the computer, by which an effective amount of at least one neutralizing chemical is introduced into the process stream. The effective amount of the at least one neutralizing chemical is sufficient to establish the second oxidation reduction potential target set point in the process stream. A second portion of the circulating water treatment system is provided for mixing the process stream with the introduced effective amount of the at least one neutralizing chemical. A second reaction proceeds between the introduced effective amount of the at least one neutralizing chemical and residual amounts of the introduced effective amount of the at least one oxidant. This second reaction establishes a second target oxidation reduction potential target set point, which is less than the first oxidation reduction potential target set point.

In particular embodiments, water from the water treatment portion is introduced back into the main water source. Some main water sources contain one or a combination of flora and fauna. When this is the case, the second target oxidation reduction potential target set point is determined in consideration of an oxidation reduction potential tolerance level of the one or a combination of flora and fauna living in the main water source. The water source can be any water source from which water is drawn and treated in accordance with the teachings presented herein.

In some embodiments, the apparatus, systems, methods and associated components, reactions and method steps of the present disclosure take place upon a watercraft. In such embodiments, the main water source comprises at least one of grey or black water produced onboard the watercraft and provides water that forms a process stream to be treated. A process stream sanitized in accordance with the teachings herein and having a second target oxidation reduction set point, to which the treated stream is maintained, can be safely conducted to and released into a body of water in which the watercraft is located. The watercraft may be docked or be moving/propelled through the body of water as the various treatment steps are carried out, for example.

In some embodiments, one or a combination of grey or black water is stored in a storage tank upon the watercraft, and is then transferred to a water treatment system to be subjected to treatment in accordance with the present teachings. The water treatment system can be onboard or proximate to a watercraft docking point, in which case the grey and/or black water is transferred to a water treatment facility that employs apparatus, systems and methods disclosed herein.

In particular embodiments, the watercraft can include a circulating water treatment system. In others, where the main water source comprises at least one of grey or black water produced onboard the watercraft, the water is treated and introduced, having the predetermined and desired second target oxidation reduction set point, into a body of water in which the watercraft is located. In particular aspects, the watercraft is propelled through the body of water at the same time as the process stream having the second target oxidation reduction set point is introduced into the body of water on which the watercraft is located, that is, occurs during the propelling/movement of the watercraft. In some embodiments, storing the at least one or a combination of grey or black water is provided by and stored in a storage tank. In particular embodiments, produced grey and/or black water can be fed directly into the process stream from their points of origin and not be stored in a storage tank.

In some embodiments, the main water source onboard includes freshwater stored onboard the watercraft, from which said grey or black water is generated. In some embodiments, the watercraft also includes apparatus to proved a step of filtering the process stream of water. In still other embodiments, a step of and apparatus for aerating the process stream is also provided onboard.

Various contaminants can be included in grey and/or black water, including, but not limited to alone or in any combination of, bacteria, viruses, natural bodily fluid of an organism and bodily secretion of an organism.

Various embodiments include a step of filtering and/or aerating of water in the process stream.

In a particular embodiment, a water treatment system is disclosed having a water source and a conduit for conducting water from the water source and providing a process stream having a process stream oxidation reduction potential. A first oxidation reduction potential sensor is disposed at a first oxidation reduction potential determination point and provides a first oxidation reduction potential which is inputted to a computer in communication with the first sensor, the computer containing a sanitizing oxidation reduction potential set point and a target effluent oxidation reduction potential set point. The system also includes at least one oxidant dispenser that introduces an oxidant, such as ozone for example, via/at a computer controlled rate, into the process stream at an oxidant introduction portion of the conduit. This raises the process stream's oxidation potential to the sanitizing oxidation reduction potential set point in the computer. The conduit also includes a first mixing portion downstream from the oxidant introduction portion for mixing the introduced oxidant into the process stream, whereby a first reaction between the oxidant, contaminants and bromide in the process stream takes place. This first reaction results in the formation of hypobromous acid, reduction of contaminants and lowers the level of oxidant. Water then travels to a second mixing portion of the conduit for mixing water, now having a first mixing portion oxidation reduction potential with a neutralizing compound. The neutralizing compound is introduced into the process stream in accordance with a computer controlled rate, the rate being based upon consideration of the first mixing portion oxidation reduction potential and the target effluent oxidation reduction potential set point. A second reaction is thereby provided and proceeds in the second mixing portion. This second reaction includes the reaction of thiosulfate ions with residual ozone or hypobromous acid or a combination of both ozone and hypobromous acid, in the process stream. This reduces ozone and hypobromous acid to oxygen and bromide, respectively, and at the same time provides and establishes, in the processing stream, an oxidation reduction potential concordant with the target effluent oxidation reduction potential set point. Water is then passed through/to a discharge portion of the conduit. In particular embodiments, the discharge portion is in communication with and conducts water to the water source, from which the now treated water first originated.

A method for controlling oxidation reduction potentials in a process stream, is also provided, where the oxidation-reduction potential of a process stream is determined with a first oxidation state probe. This first target oxidation-reduction potential set point is inputted into a computer. An effective amount of an oxidant is then injected into the process stream based on the determination from the first probe and variations from the first set point. A second measurement is taken, determining the oxidation-reduction potential of the process stream with a second oxidation state probe downstream from the first probe. The computer has inputted therein a second target oxidation-reduction potential set point into a computer. An effective amount of a neutralizing chemical is injected into the process stream based on measurements from the second probe and variations from the second set point.

BRIEF DESCRIPTION OF THE DRAWINGS

The foregoing aspects and many of the attendant advantages provided herein will become more readily appreciated as the same becomes better understood by reference to the following detailed description, when taken in conjunction with the accompanying drawings, wherein.

DETAILED DESCRIPTION

Particular embodiments of the invention are described below for the purpose of illustrating its principles and operation. However, various modifications may be made, and the scope of the invention is not limited to the exemplary embodiments described below.

Figure 1:
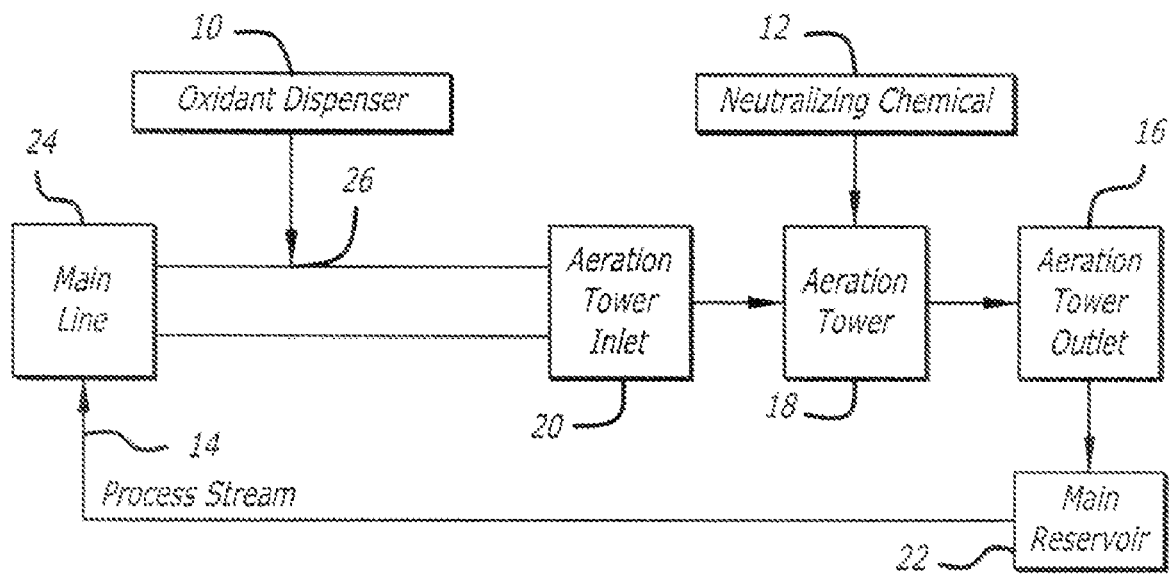
FIG. 1 illustrates an overview of an exemplary system in accordance with one aspect of the present disclosure.

One general embodiment of the system and method of the present disclosure is illustrated by FIG. 1. Here, a process stream 14 containing water from a water source, such a main reservoir 22, for example, is obtained. In one example, main reservoir 22 is an aquatic tank or aquarium, such as those typically found at aquatic water parks and that contain aquatic life forms that excrete bodily fluids into the water of the tanks. However, any body of water, such as a lake or ocean, may have water taken from, treated and returned in accordance with the teachings provided herein. The process stream 14 flows through a main line 24. At a main line injection point 26, at least one oxidant is added to the process stream 14 from at least one oxidant dispenser 10. The oxidizing agent cleans and sanitizes the process stream 14 as it flows through the main line 24. That is, oxidation-reduction reactions take place between the introduced at least one oxidant and contaminants in water of process stream 14.

In this embodiment, downstream from main line injection point 26, process stream 14 enters an aeration tower 18 at an aeration tower inlet 20. In this particular embodiment, aeration tower 18 is a rectangular concrete structure approximately a height of 40 ft, a width of 15 ft, and a length of 15 ft, for example. The volume/capacity of an exemplary tower is about 67,000 gallons. As water in process stream 14 is flowing through aeration tower 18, a neutralizing chemical 12 is added to the top of aeration tower 18. While the process stream 14 is passed through aeration tower 18 and neutralizing chemical 12 is added, neutralizing chemical 12 neutralizes surplus oxidants that were added at a main line injection point 26 into process stream 14. Addition of neutralizing chemical 12 also converts harmful by-products produced as a result of the oxidation-reduction reaction to safe compounds. Process stream 14 then flows into the main reservoir 22 through an aeration tower outlet 16.

While aeration tower 18 is included and is used in the exemplary embodiment schematically depicted in FIG. 1, there exist several variations to this component, that is, a portion of the system where water from a water source mixes with at least one oxidant that is introduced into process stream 14. Other secondary holding areas such as discharge pipes or storage tanks could also be utilized. Generally, at least one oxidizing agent is injected into a process stream. Downstream from this injection point, a conversion or neutralizing chemical is injected into the process. Further downstream, the amount of chemicals in the process are measured to determine what adjustments need to be made to the injection rates of both the at least one oxidant and at least one neutralizing chemical.

Figure 2:
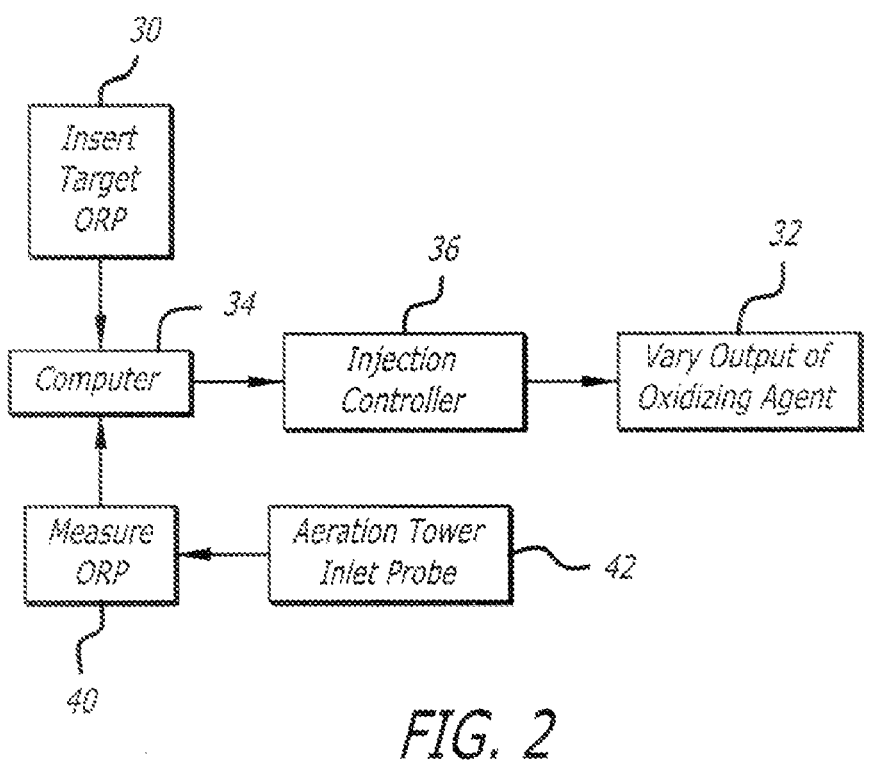
FIG. 2 illustrates one exemplary process control components of the system for an oxidation injection.

One embodiment of useful control apparatus for injecting at least one oxidizing agent is depicted in FIG. 2. An aeration tower inlet probe 42 measures the oxidation reduction potential (ORP) 40 of process stream 14 as it flows through aeration tower inlet 20. A target ORP set point 30 is pre-selected and entered into a master controller, such as a computer 34. These sensors (sensors/probes that measure the ORP of water at various stages) serve as data inputs to a microprocessor or analog based computer. The computer employs some mode of control utilizing Time Based Proportional (TBP), Proportional (P), Proportional Integral (PI), Proportional Integral Differential (PID) and/or on/off control for controlling chemical(s) feed, that is, feed of the at least one oxidant and/or the at least one neutralizing chemical into process stream 14. Computer 34 can be programmed utilizing either Fuzzy logic or Boolean logic protocols to provide the system with the ability to make changes to various settings or feed adjustments based on evaluation of input data obtained in real-time.

For example, in one embodiment, a supervisory control and data acquisition (SCADA) distributed intelligence system is utilized. In this embodiment, numerous devices are linked together and monitored and controlled by a master computer. In a smaller system, one would use as few as one computer to control the water treatment system. Based on a difference between target set point 30 and measured ORP reading 40, an injection Proportional-Integral-Derivative (PID) controller 36, for example, will vary the output of the at least one oxidant 32 dispensed into process stream 14.

Examples of other controllers that could be used include simple "pumps" that deliver set rates of material until told to turn off by the computer. A PID controller, for example, is an algorithm embedded within the control program that looks at rate of change and formulates a "look ahead" delivery rate to dose to target. The PID controller looks at the curve slope and varies output based on rate of change (slope dy/dx) and distance to target. Such an approach is less critical with high impedance systems, those that respond vary slowly to input, than with those systems that are less stable and can change dramatically with small input (in this case oxidant delivery) changes.

Figure 3:
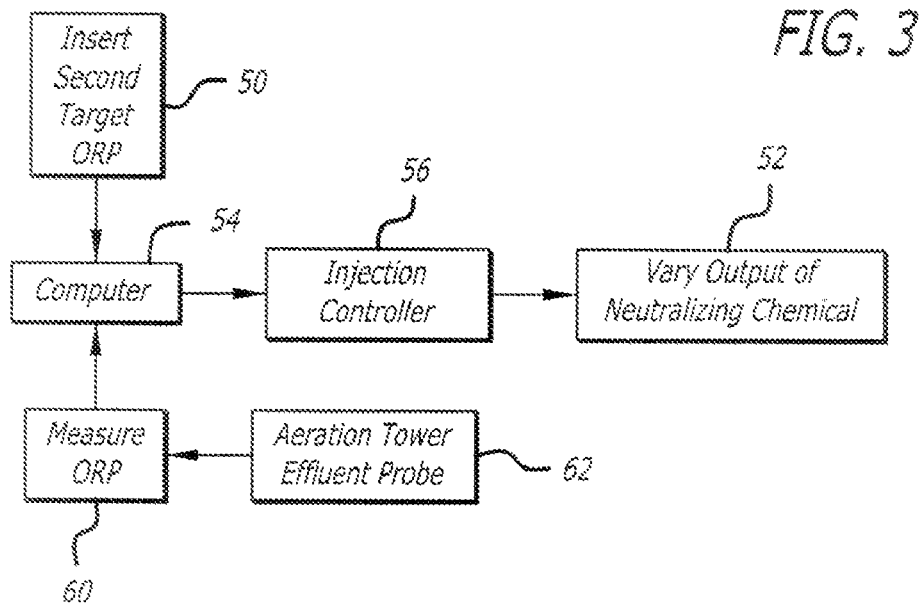
FIG. 3 illustrates one exemplary of process control components of the system for neutralizing chemical addition.

An exemplary embodiment of control apparatus utilized to inject at least one neutralizing chemical into process stream 14 is illustrated in FIG. 3. An aeration tower effluent probe 62 measures the ORP 60 of the process stream 14 as it flows through the aeration tower outlet 16. A second target ORP set point 50, which is an ORP value that is pre-selected, is entered into a computer 34. Based on the difference between second target set point 50 and the measured ORP reading 60, taken by aeration tower effluent probe 62, an injection Proportional-Integral-Derivative (PID) controller 56 will vary the output/ rate of the at least one neutralizing chemical 52 dispensed into the process stream 14 by at least one neutralizing chemical dispenser. In one aspect, the least one neutralizing chemical is introduced in order to interact with any residual amounts of the at least one oxidant 32 dispensed into process stream 14 that is still present and provides an ORP value that is too high to safely pass aeration tower outlet 16 and be introduced into a body of water. This second oxidation-reduction reaction typically takes place between the at least one neutralizing chemical 52 and residual amounts of oxidants that were added at a main line injection point 26 and as well as between the at least one neutralizing chemical 52 and other oxidizing species, such as, but not limited to hypobromous acid and hypochlorous acid, that form as a result of introduction of the at least one oxidant into process stream 14.

There exist other possible ways to control this sensitive process for accurately balancing and varying the amount/rate of introduced oxidizing agents from at least one oxidant dispenser 10 to raise the ORP of process stream 14 to a desired predetermined sanitizing ORP level, allow a first reaction to proceed between the introduced at least one oxidant and contaminants in the process stream and then neutralizing residual oxidizing species such that a second target ORP is achieved.

For example, instead of utilizing oxidation-reduction probes/sensors which measure the presence of an oxidant, but cannot differentiate between the types of oxidants in the process stream, direct readings of specific oxidants such as chlorine or ozone using the appropriate respective meters could be used to detect the amount of chemicals. For example, a probe that measures chlorine or ozone is specifically designed to directly measure that oxidant only and produce a quantifiable value, i.e. ppm or mg/L of the measured oxidant. A calorimetric sensor, for example an in-line spectrophotometer, which measures the color changes of a process stream as a result of addition of the reactants, could also be utilized.

Figure 4:
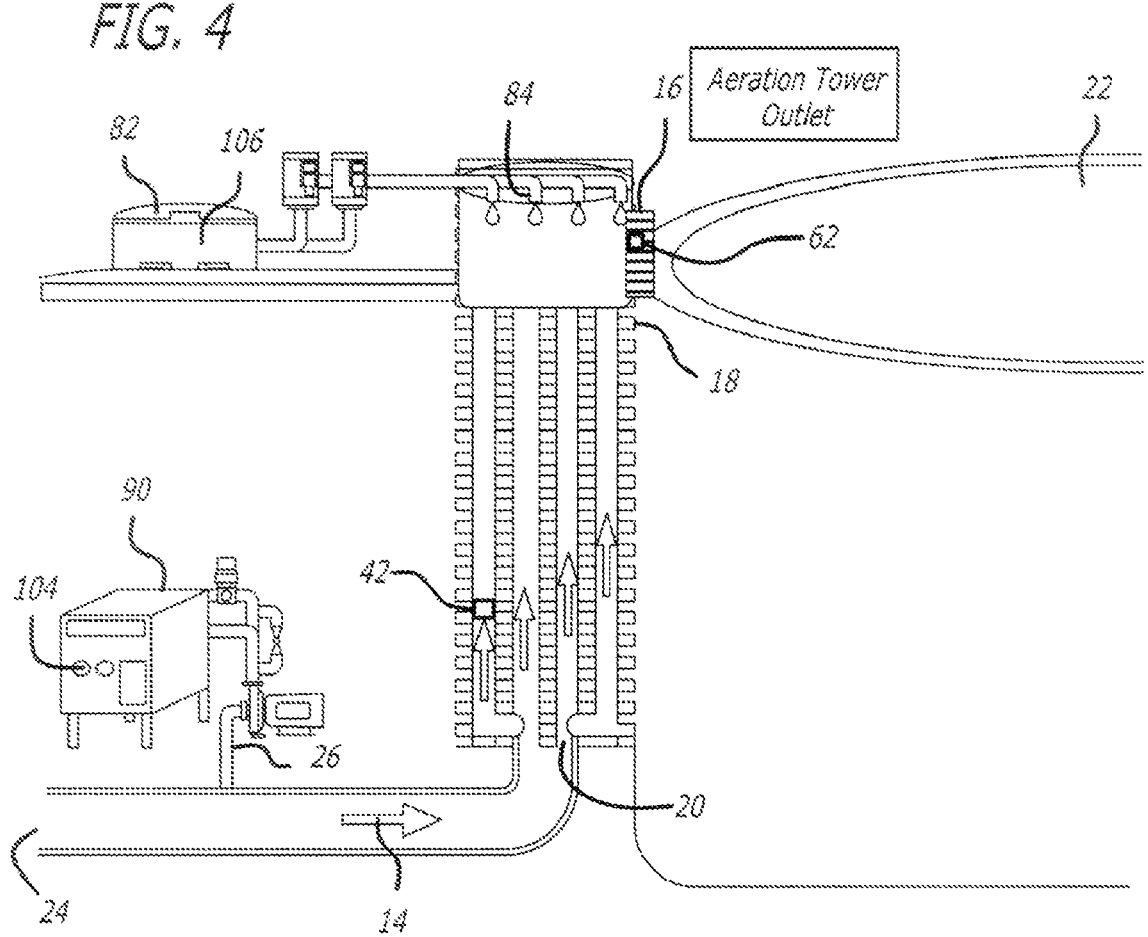
FIG. 4 illustrates one embodiment as applied to a large-scale commercial aquarium.

FIG. 4 shows one example of an embodiment of a water treatment system used in a large-scale commercial aquarium containing seawater. In this example, process stream 14 flows from water source such as, a main reservoir 22, into a water treatment system comprising a main line 24 and an aeration tower 18, before flowing back into main reservoir 22. In another exemplary embodiment, the process stream separates from the water supply at tank skimmers (not shown). In one example, the water treatment system can utilize a filter or filtering arrangements as part of the water treatment process/apparatus. In one embodiment, water enters a 48" pipe and travels to ten 30 ft by 10 ft high pressurized sand filters which remove particulate matter to 5 microns. The water then reenters main line 24 where at least one oxidant, such as ozone, is injected at main line injection point 26. Aeration tower 18 contains both an inlet 20 and an outlet 16 for the process stream 14 to traverse. While process stream 14 travels through the system it is sanitized.

To sanitize the process stream 14 in this implementation, at least one oxidants is added to the main line 24 at the main line injection point 26. In this particular embodiment, main line 24 pipe diameter is 48" and the flow rate of the process stream 14 is approximately 30,000 gallons per minute. Exemplary oxidants include, but are not limited to ozone, bromine and chlorine.

In one embodiment, ozone 104 is added to process stream 14 from at least one ozone generator 90, such as a liquid-oxygen-based ozone generator, for example. An exemplary ozone generator that can be utilized is identified under the trade name MEGOS, manufactured by Schmidding, Inc. of Germany. In this particular embodiment, approximately 15 to 22 lbs of ozone 104 is added each day at a rate of 0.061 mg/L.

This is one exemplary concentration based on the ozone production rate in mass per unit time and flow rate (volume per unit time) and employing particular calculations for the mass transfer of the ozone into solution. Because of the highly variable nature of the process stream, the amount of ozone required to produce a sanitizing ORP will vary depending on the oxidation demand of the contaminants (e.g. contaminant level and/or type or types) in the process stream. Accordingly a PID computer control system is advantageously disclosed and taught herein, since such system can accommodate the changes in oxidant demand to reach or maintain a desired ORP that will sanitize the process stream.

An exemplary oxidation reaction where ozone 104 is the oxidant and which occurs in process stream 14 is shown below.

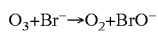

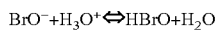

The injected ozone 104 will react with a number of organic compounds, lyse bacterial cell walls, decolorize chromophores, and react with bromide ions present in the water that makes up process stream 14. The ozone 104 will oxidize bromide into hypobromite ions. The hypobromite ion is a weak acid and so will exist in its protonated and unprotonated form, the respective ratios being based on the acidity of the system's seawater.

With the appropriate reaction time, in this exemplary implementation of the teachings provided herein, measured from the point of ozone injection 26 to a top of the aeration tower 84, for example, about 3 minutes, the predominant residual oxidants that are responsible for driving the ORP at the location of the aeration tower inlet probe 42 are dissolved ozone and hypobromous acid.

This is just one example of possible oxidation reactions that occur in an exemplary filtration and water treatment method. Due to the nature of this system and in accordance with the teachings provided herein, that is, the consistent computer controlled introduction of chemicals that exhibit a high oxidation state, such as ozone and exhibit toxicity on oxidative power, such as thiosulfate containing compounds, can be employed. For example, other oxidizing agents, such as, but not limited to, chlorine, bromine, and other halogens, could also be used in addition to ozone.

In the embodiment shown in FIG. 4, at the top of aeration tower 84, dissolved sodium thiosulfate 106 from a supply tank 82 is injected at a rate specified by the Proportional-Integral-Derivative controller, based on the second target ORP set point for the aeration tower effluent probe 62. The probe 62 measures the amount of oxidizing agents in the system, and an amount of sodium thiosulfate 106 is added to neutralize the oxidizing agents. The neutralizing chemical, in this case a sodium thiosulfate solution, is prepared at a specific concentration. A typical concentration of sodium thiosulfate solution is approximately 45 mg/L as sodium thiosulfate. Too high a concentration of thiosulfate could lead to an overly aggressive response from the injection of the neutralizing chemical which could lead to an excessive dampening of the second target ORP. Conversely, a too weak of a thiosulfate solution could lead an insufficient response (damping) of the ORP levels and may require amounts of solution that exceed the pumping capacity of the injection pumps. Thiosulfate ions immediately react with residual ozone and hypobromous acid, reducing them into oxygen and bromide, respectively. This in turn reduces the first target ORP to the second targeted ORP level, which is a desired, safe level. Exemplary reactions for this embodiment is shown below.

$$4O_3 + 2S_2O_3^{2-} + 4OH^- \rightarrow 4SO_4^{2-} + 2O_2 + 2H_2O$$

$$Br_2 + 2S_2O_3^{2-} \rightarrow 2Br^- + S_4O_6^{2-}$$

This is just one example of the possible conversion reaction that could occur in this filtration method. Other neutralizing chemicals, such as sulfur dioxide, ascorbic acid or sodium sulfite, could also be used in addition to or in place of sodium thiosulfate. Alternative embodiments would be obvious to one skilled in the art, in light of the teachings disclosed herein.

In the example utilizing the exemplary configuration in FIG. 4, seawater traverses through the filtration and water treatment system and back to the main reservoir 22. A high level of ozone 104 is injected by venturi into the main line injection point 26. An exemplary level of ozone could be considered where the residual concentration after reacting with contaminates is greater than 0.02 mg/L. This level is relative, since for an aquarium system it could be considered a high level. For other potential disinfection applications a high level could be a residual ozone concentration of about 0.1 to 0.5 mg/L or greater, such as 0.5 to 1.0 mg/L, for example. Ultimately, it is the targeted ORP level that would be dictating as to the level of disinfection in a first mixing chamber or portion, such as ORP levels above 700 mV to as high as 900 mV, for example.

The ozone can be introduced via a gas bubble diffuser to produce the fine gas bubbles required for mass transfer. An inline static mixer could be used also to shear the gas bubbles into the process stream and thereby achieve mass transfer. In one example, the injection rate is digitally controlled to maintain an ORP level at an exemplary target set point of 850 mV, measured at the aeration tower inlet 20. This is one example of a sanitizing oxidation reduction potential. In theory, such a sanitizing oxidation reduction level can be between about 700 mV and about 900 mV. The injected ozone 104 reacts with the seawater, destroying contaminants and disinfects the process stream 14 during its traverse to the aeration tower inlet 20. A set distance based on pipe diameter, length and flow rates is needed to provide enough time for this first reaction, that includes the introduced at least one oxidant and contaminants, to occur. Exemplary reaction times for most oxidizers are in the order of about three to five minutes. Of course longer or shorter first reaction times may be utilized or necessary in accordance with, for example and not limited to, contamination levels of the water, the amount and/or type of oxidant introduced to the process stream, pipe size and length, among other factors. The optimal reaction times can depend on a number of factors, usually related to the species or target contaminant that is intended to be oxidized. For disinfection of most bacterial, viral and parasitic containing waters, a reaction time of up to five minutes with ozone residual concentrations in the 1 mg/L range is considered to be adequate. Conversely, in some process streams, the reaction time can be significantly shorter, for example 2 to 3 minutes, if the target contaminants have a fast reaction rate with ozone, such as nitrite, iron, hydrogen sulfide, most chromophores, etc.

While inside aeration tower 18, sodium thiosulfate 106 is injected into process stream 14 to reduce the first target ORP to a second target oxidation reduction set point, which can be about 600 mV, for example. Other exemplary second target oxidation reduction set points may be achieved in accordance with variables such as water profiles into which effluent water is to be released and/or the presence of flora and/or fauna in areas into which treated water may be released. If, for example, the release point contains aquatic animals that are very sensitive to oxidants, as represented by ORP, and the amount of discharged water is fractionally a high percentage of the overall system volume, the discharge set point could be as low as 220 mV. Exemplary life forms (i.e. flora and fauna) include, but are not limited to, Chordata, Echinodermata, Arthropoda, Mollusca, Cnidaria, Porifera and Angiospermophyta organisms. The discharge stream from an ocean going vessel, such as a cruise ship, is typically highly regulated in accordance with various laws to reduce possible degradation of sensitive aquatic life such as coral reefs. In such instance, it is desirable to be able to control/regulate the effluent discharge stream such that it effectively matches the water conditions around the reef, in terms of oxidant potential, and thus does not cause harm. The injection rate of the at least one neutralizing chemical, here sodium thiosulfate, is controlled and varied, by computer, to achieve the desired second target oxidation reduction set point. At this point in this exemplary embodiment, treated water enters the aquarium and after mixing leaves a residual ORP of 250 mV in the display. Oxidation state sensors/probes in the main reservoir 22 monitor ORP and provide checks that the system is functioning properly.

Figure 6:
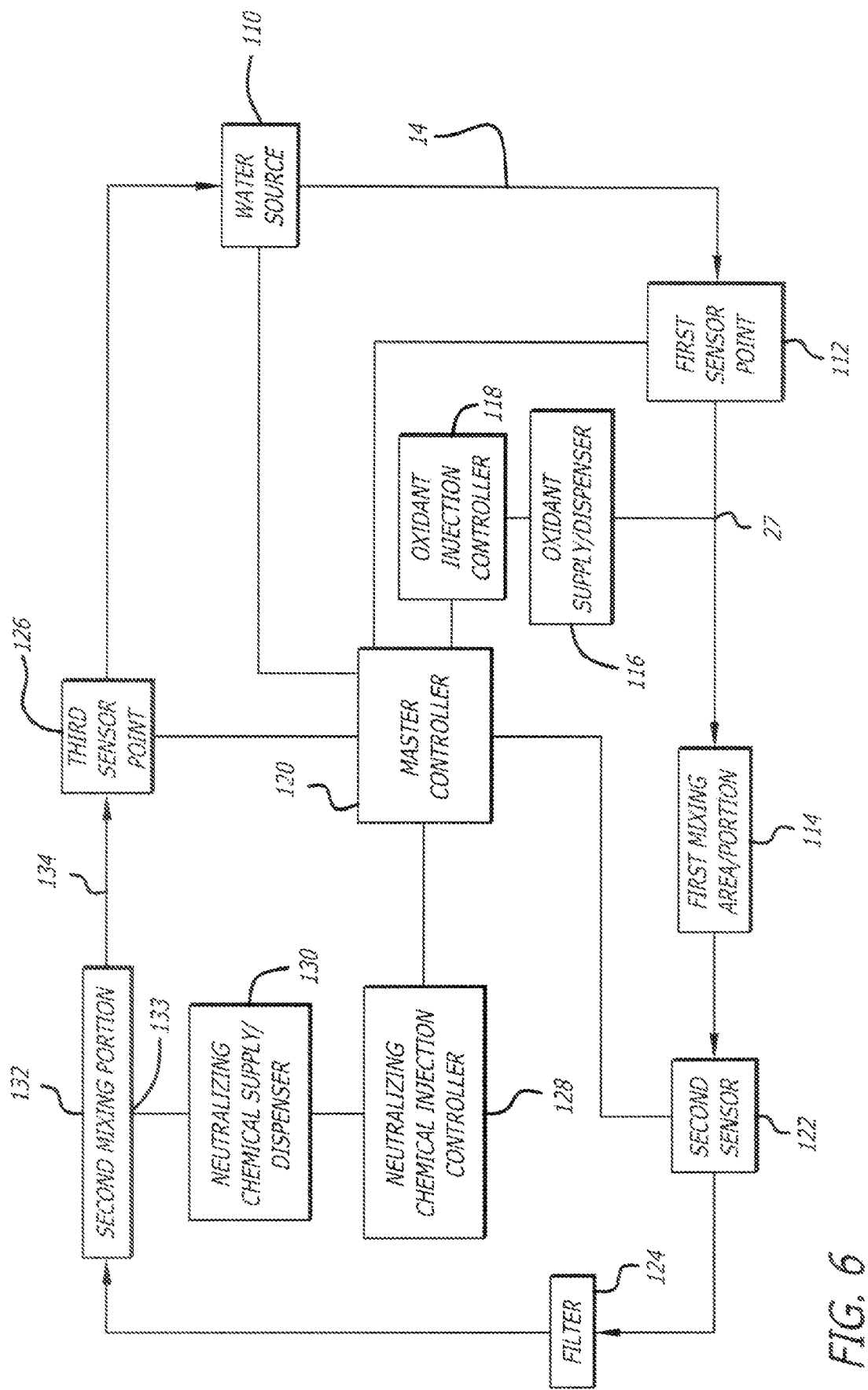
FIG. 6 depicts one exemplary configuration of exemplary components of a water treatment system in accordance with the teachings of the present disclosure.

Turning to FIG. 6, an exemplary configuration of exemplary components of a water treatment system in accordance with the teachings of the present disclosure is provided. A water source 110 from which water in process stream 14 in a flow path originates is provided. In this embodiment, the water treatment system is a closed system, that is, water that is taken from water source 110 is taken, treated and then returned back to water source 110.

As water in process stream 14 is conducted though the exemplary water treatment system, a first sensor point 112 is reached. Here, a starting oxidation reduction potential is measured and relayed to a master controller 120. Master controller 120 can be an analog or digital computer. Master controller then compares this starting oxidation reduction potential to a first target oxidation reduction potential set point. Based upon this difference master controller 120, which is in communication with an oxidant injection controller 118, communicates this difference to the oxidation injection controller 118 which in turn injects, via at least one oxidant supply/dispenser 116, at least one oxidant into process stream 14, at at least one oxidant injection point 27. The at least one oxidant and water then proceed to mix at a first mixing portion 114 of the flow path to raise the starting oxidation reduction potential to a first target oxidation reduction potential set point in order to sanitize process stream 14 of contaminants in the water. The first mixing portion 114 may be a tank or a length of pipe or a section of the flow path having appropriate dimensions to facilitate thorough mixing of water at the at least one introduced oxidant. For example, pipes, for example, greater than 24 in. in diameter, retention basins, or contact chambers configured similarly to storage tanks located in the flow path can be utilized for the first mixing/dosing portion 114. The target first target oxidation reduction potential set point, in one example, is anywhere from about 700 to 900 mV ORP or any range or ranges therebetween, and can be achieved in any of these vessels whose function is to retain water while the oxidant is introduced until a desired set point is achieved, here a first target oxidation reduction potential set point . Once the target dosing level is achieved the water should remain in the vessel long enough for the desired sanitizing oxidation reactions to occur. In one example, when utilizing ozone, a vessel large enough to retain the water in a dynamic process for two minutes or thereabouts, can be utilized after the target dose, that is, a first target oxidation reduction potential set point, typically 800 mV or thereabouts, is achieved. Of course, this time can be varied in accordance with the final ORP levels desired.

The water in the flow path then comes upon a second sensor/probe point 122 at which a second oxidation reduction potential is measured. The second sensor/probe point 122 is also in communication with master controller 120. Master controller then compares this new oxidation reduction potential value, established after introduction and mixing of the at least one oxidant with the water in process stream 14, with a desired second target oxidation reduction set point. Accordingly, master controller 120 communicates to neutralizing chemical injection controller 128 to introduce an effective amount of at least one neutralizing chemical from at least one neutralizing chemical supply/dispenser 130. The at least one neutralizing chemical supply/dispenser 130 is in communication with process stream 14 via at least one neutralizing chemical injection point 133 along the flow path. The at least one neutralizing chemical injection point 133 can be located before or in a second mixing portion 132 of the flow path. During the passage of water through second mixing portion 132, the introduced effective amount of at least one neutralizing chemical reacts with remaining portions of oxidant and other oxidizing species in order to lower the oxidation reduction potential of the water from about the first target oxidation reduction potential set point to the second target oxidation reduction set point. As various useful configurations are contemplated for first mixing portion 114, various useful configurations of second mixing portion 132 of the flow path are also contemplated, including but not limited to venturi configurations, use of at least one inline static mixer, or gaseous diffusers such as, but not limited to, ceramic "air stones", bubblers, or specially designed counter current labyrinthal contact chambers, or any combination thereof. A third sensor point 126, in communication with master controller and downstream of second mixing portion 132, can be provided so as to monitor effluent oxidation reduction potentials of water emanating from second mixing portion 132. This would prevent the routing of water back to water source 110 that does not have the proper oxidation reduction potential profile, that is, an oxidation reduction potential that is too high or too low in relation to a desired oxidation reduction potential level or range of oxidation reduction potentials.

Figure 7:
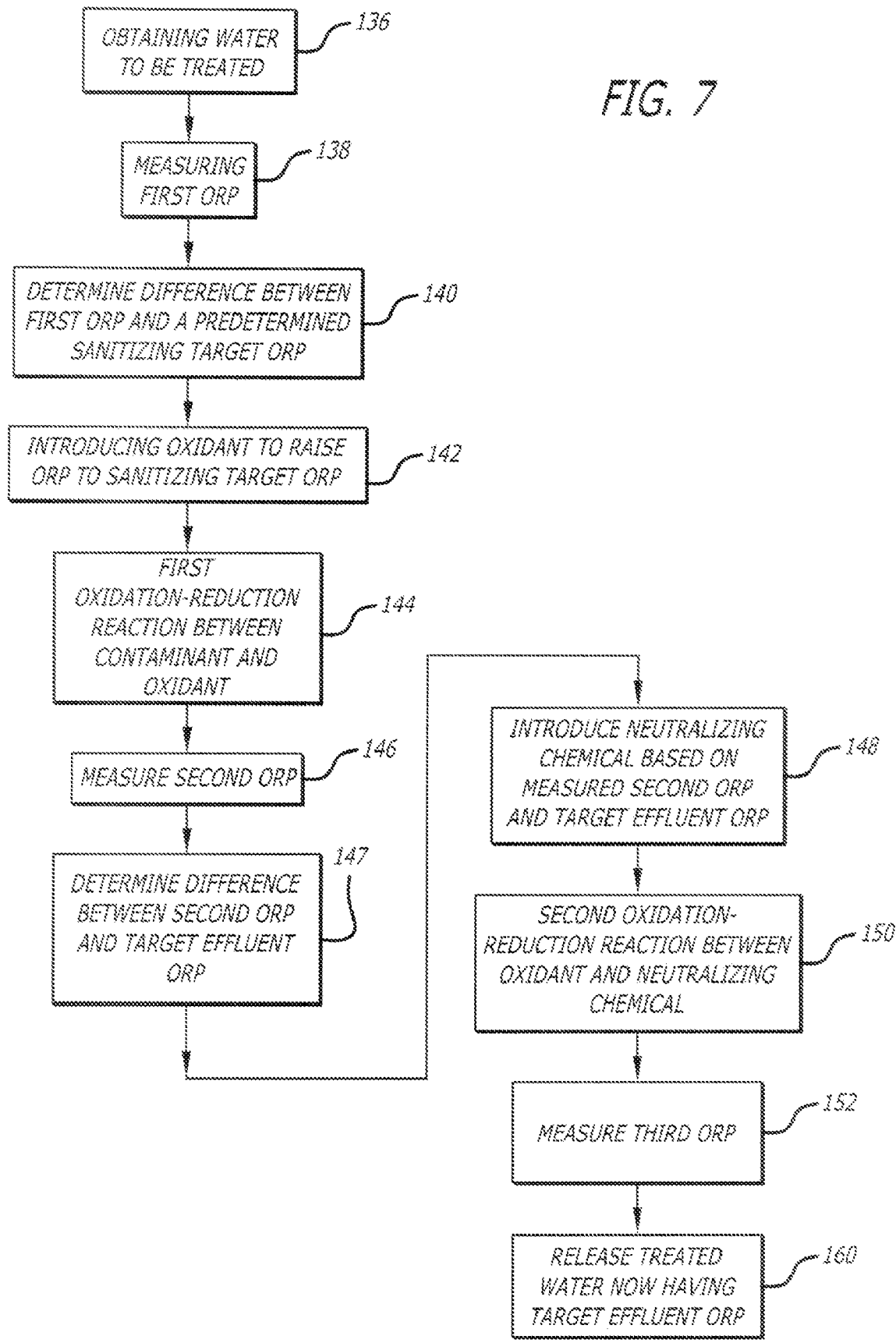
FIG. 7 depicts steps of one exemplary method for treating water.

Various effective and accurate water treatment methods are also provide by the teachings of the present disclosure. An exemplary methodology is depicted in FIG. 7. Some exemplary methods provided herein include a step of obtaining water to be treated 136 from a water source. Such water can originate from various water sources. Water to be treated can originate from a lake, a sea, a stream, an ocean, a storage tank, an aquarium, a swimming pool, a fountain, a river, a contaminated spill area, a delta, a swamp, a pond, a channel, a sewer or a canal. Water to be treated may also come from storage tanks and/or at least one receptacle that are located onboard watercraft and that contain grey and/or black water, for example. Grey water is typically used water from showers, sinks or basins, including used kitchen water. Black water is water contaminated with human waste, collected from shipboard toilets. Water to be treated can also originate from food processing stations/areas. Such stations can be food processing stations typically found at meat handling/processing centers, where large volumes of water are utilized during food production and handling, and which, as a result, contain various contaminants such as, but not limited to, intracellular fluid and/or interstitial fluids, blood, fat, bacteria, bodily secretion such as feces, urine, saliva, semen, mucus and the like. In some embodiments, washing of at least one food item takes place at a food processing station.

Another application to which the water treatment methods and apparatus of the present disclosure may be applied are post harvesting and handling activities of fruits and vegetables, which typically require large volumes of water. Economic considerations and wastewater discharge regulations make water recirculation a common practice in the agriculture industry. Disinfection of water is a critical step to minimize the potential transmission of pathogens from a water source to produce, among produce within a lot, and between lots over time. Water-borne microorganisms, whether postharvest plant pathogens or other pathogens that can cause illness, can be rapidly acquired and taken up on plant surfaces. Natural plant surface contours, natural openings, harvest-and trimming wounds, and handling injuries are known points of entry for microbes. Within these protected sites, microbes are unaffected by common postharvest water treatments. It is essential, therefore, that water used for washing, cooling, transporting, postharvest drenches, or procedures be maintained in a condition suitable for the application, that is, have a controllable and desired oxidation reduction potential. By utilizing and in accordance with the teachings provided herein, water utilized in such operations can be recycled, and money saved, due to the accurate establishment and control of sanitizing oxidation reduction potentials provided by the teachings provided herein.

Water to be treated 136 has a first oxidation reduction potential measured 138. A difference between the first oxidation reduction potential measured 138 and a predetermined sanitizing target oxidation reduction potential is determined 140. Based upon these differences, wherein the predetermined sanitizing target oxidation reduction potential is an ORP higher than the first oxidation reduction potential measured 138, at least one oxidant is introduced 142 into the water to be treated in order to raise the ORP to the predetermined sanitizing target oxidation reduction potential. Upon introduction of said at least one oxidant to the water to be treated, a first reaction takes place reaction between the at least one oxidant and contaminants in the water, where at least a portion of introduced oxidant is reduced and contaminants in the water are oxidized. A second ORP 146 is measured to check to determine that the predetermined sanitizing target oxidation reduction potential has been reached. This second ORP is then compared to a target effluent oxidation reduction potential and, if existing, the difference between the two is determined 147, and based upon this comparison, at least one neutralizing chemical is introduced to the water 148 in order to initiate a second oxidation reduction reaction 150 that proceeds between the at least one neutralizing chemical and remaining levels of the at least one oxidant that was introduced into the water and/or other oxidizing species that are in the water. This second oxidation reduction reaction 150 proceeds to a point at which a third ORP is measured 152 and the water attains the target effluent oxidation reduction potential, after which the water is released 160. The release can be back to the water source from which it came or to storage tanks or other receptacles for transport and/or storage and/or further use.

Figure 8:
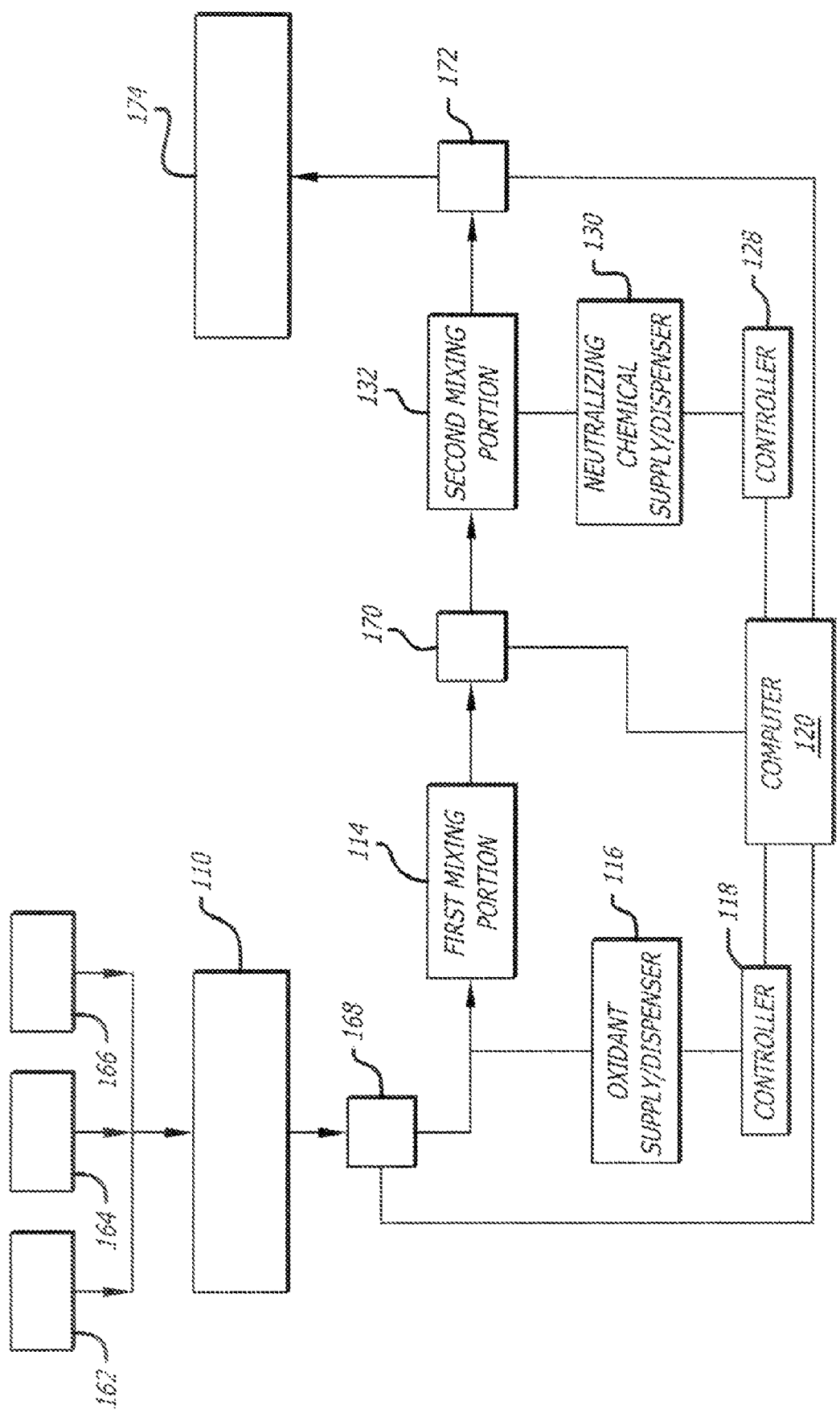
FIG. 8 depicts one exemplary embodiment wherein water treatment occurs onboard a watercraft.

In particular embodiments, the water treatment apparatus, systems and methods disclosed herein can be utilized onboard watercraft or with water to be treated that originates from onboard activities. An exemplary depiction of one embodiment of such a water treatment system is shown in FIG. 8. Water is utilized at various locations onboard a watercraft and collected. Exemplary locations include kitchens 162, basins 164, and bathrooms 166. While only three exemplary locations are depicted, the number of points from which either black and/or grey water can be generated can be as few as one location or many hundreds or even thousand of locations onboard a watercraft, depending on its size. Exemplary watercraft include, but are not limited to, personal boats and house boats, naval vessels, including clippers, destroyers, frigates, battleships, aircraft carriers, support vessels, surface combatants in general, submarines, and patrol boats. Other vessels which can employ the water treatment methods, system and apparatus disclosed herein include cruise ships and other pleasure craft. Water discharge and water pollution by such watercraft are of great concern, particularly when such watercraft are proximate to bodies of water/areas that support ecosystems that can be harmed by water discharged from such watercraft. Such areas include, but are not limited to, coral reefs, lagoons, marshes, stream and river mouths.

Bathrooms 166 typically include a shower, which can form a portion of the grey water generated onboard, and a toilet, which will contribute to black water generated onboard. From these exemplary locations, water is collected at a central water collection point 110. From this water source, a process stream is established (arrows in FIG. 8) from which a first oxidation potential is measured at a first point by a first sensor probe 168. First sensor probe 168, is in communication with a computer 120 and relays this information to computer 120. Computer 120 then compares this first oxidation potential with a first target oxidation reduction potential set point, which is a sanitizing oxidation reduction potential. Computer 120 is in communication with a first controller 128 that controls introduction (rate/amount) of at least one oxidant from an oxidant supply/dispenser 116 into the process stream of water. Water, now including the introduced at least one oxidant, transverses a first mixing portion 114 of a treatment conduit, where the introduced at least one oxidant and contaminants in the grey and/or black water interact and where the first target oxidation reduction potential set point is established, to disinfect/sanitize the water of process stream. Water in the process stream then contacts a second sensor probe 170, which is also in communication with computer 120, which measures a second oxidation reduction potential and transmits the data to computer to computer 120. Computer 120 then compares this second oxidation reduction potential to a second oxidation reduction potential set point that is an effluent target oxidation reduction potential set point. Based on the comparison of this second oxidation reduction potential to a second oxidation reduction potential set point, computer 120 communicates with a second controller 118 that controls introduction of (rate/amount) of at least one neutralizing chemical into the process stream. Introduction of at least one neutralizing chemical can be before the process steam reaches a second mixing portion 132 of the treatment conduit or directly into the second mixing portion 132. Water is then mixed with the at least one neutralizing chemical in order to lower the oxidation reduction potential of the water to the second oxidation reduction potential set point. During this reaction, the at least on chemical reacts with any residual amounts of the least one oxidant and other oxidizing species that are in the water, such as hypochlorous acid, hypobromous acid, of the process stream. Exemplary oxidants and neutralizing chemicals include ozone and sodium thiosulfate. A third sensor probe 172 can be placed in the conduit, in communication with computer 120 in order to check and verify that water leaving second mixing portion 132 has an oxidation reduction potential concordant with the second oxidation reduction potential set point. Water is then passed to a final destination 174. Final destination can be, but is not limited to, a holding tank, a sea, a lake, a stream, an ocean, a storage tank, a river, a delta, a swamp, a pond, a channel, or a canal or any combination thereof.

Figure 5:
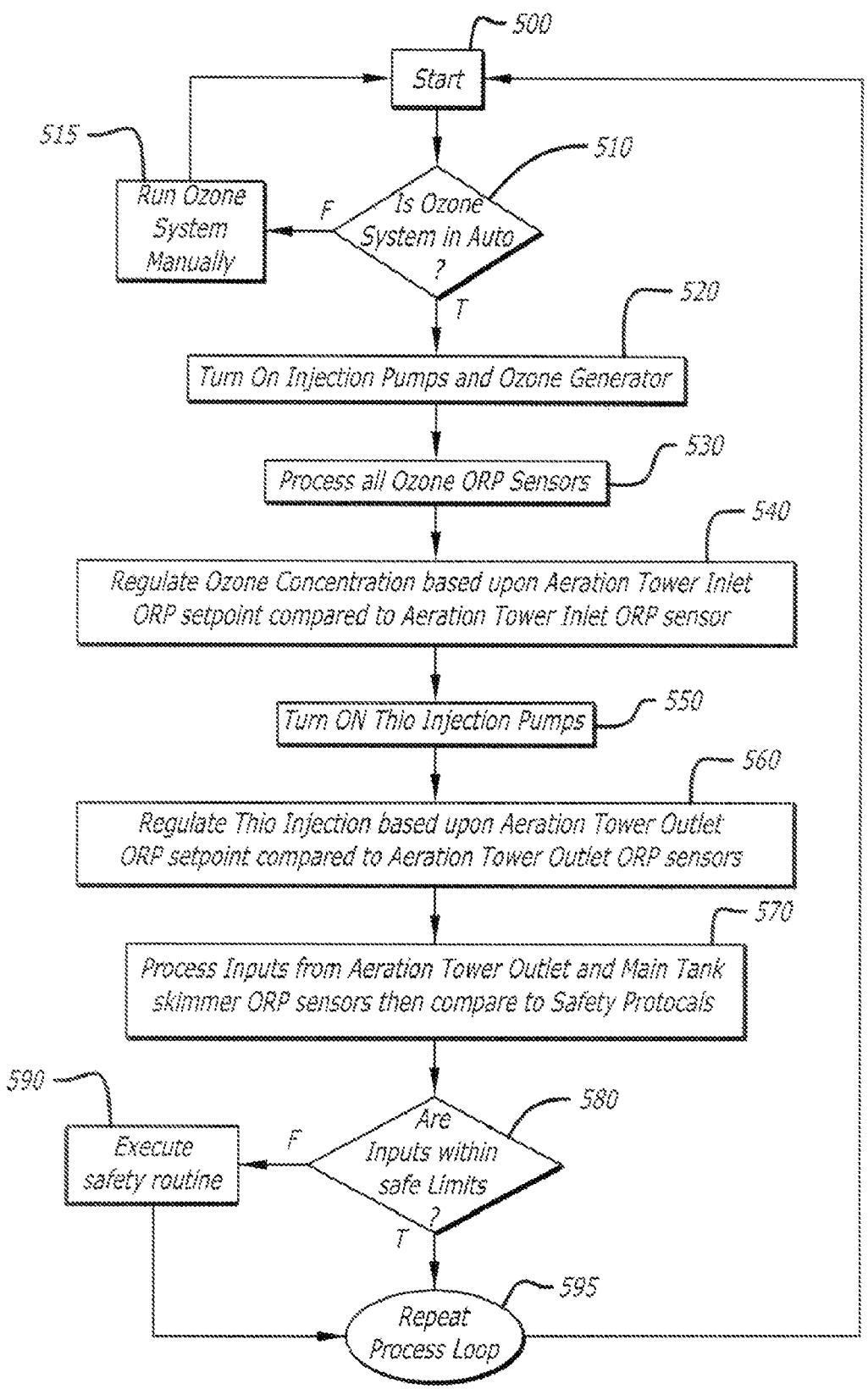
FIG. 5 illustrates one exemplary process flow diagram of one embodiment as applied to a large-scale commercial aquarium.

In accordance with one aspect of the teachings presented herein, an exemplary process flow diagram for one embodiment is illustrated in FIG. 5, which depicts an exemplary schematic of an ozone system process flow for water treatment for an aquarium system. Computer 34 (not shown) first determines if the system is being run in a manual or automatic mode at block 510. In manual mode the system does not function, and thus there is no regulation of ORP potentials. In automatic mode, software is used to control the process as illustrated in FIG. 5. In one exemplary embodiment, software such as the FactoryFloor product suite including, for example, OptoControl, a graphical flowchart-based development environment with optional scripting, OptoDisplay, a full-featured HMI with advanced trending, OptoServer, an OPC/DDE server, and OptoConnect, a bidirectional interface between databases and control systems as manufactured by Opto 22 (Temecula, Calif., USA) is used to automate the system.

When running in automatic mode, and as depicted in FIG. 5,

Action Blocks—(Rectangles) contain commands like turning things on and off and setting variables;

Condition Blocks—(Diamonds) contain commands that decide whether or not a variable is true or not;

Continue Blocks—(Ovals) contain no commands but route the process to the top of the chart, such as a start routine.

As indicated at block 500 the program is initiated and starts processing. As indicated at Block 510, Computer 34 determines if the ozone system has been selected to process the control routine based on a "TRUE" (automatic) or "FALSE" (manual) selection from a human interface. If the operator has not selected to operated the ozone system in automatic mode, the process proceeds with manual operations 515 until an automatic selection has been made.

Selection of automatic mode prompts at least one ozone injection pump and at least one ozone generator to turn on, as shown at block 520. Block 530 verifies that all sensors, here ORP sensors, are operating within system tolerances. Subsequent to turning on ozone generators and reading process inputs from an aeration tower inlet ORP sensor, the system will regulate the concentration of ozone based on readings from aeration tower inlet ORP and the pre-determined first target oxidation reduction potential set point, which is a sanitizing level of oxidation reduction potential. This is indicated at block 540. In this embodiment, at least one thiosulfate pumps are then turned on at block 550. Block 560 regulates injection of at least one neutralizing chemical, here thiosulfate in solution, based on readings from a second ORP probe/sensor at the aeration tower outlet, as compared to a predetermined effluent set point. The system then processes the readings from the water source, here a main aquarium tank, and determines if the readings are within safe limits, as indicated at block 570. If the readings are within the safe limits (block 580), the process is repeated again. If levels are not found to be safe, then, at block 590, a safety routine, including a set of instructions which will set oxidant generators/oxidant dispensers, such as ozone generators, output to zero until input readings from the main tank return to a safe level, is run. The process is then repeated over again from the start, as indicated at block 595.

Figure 9:
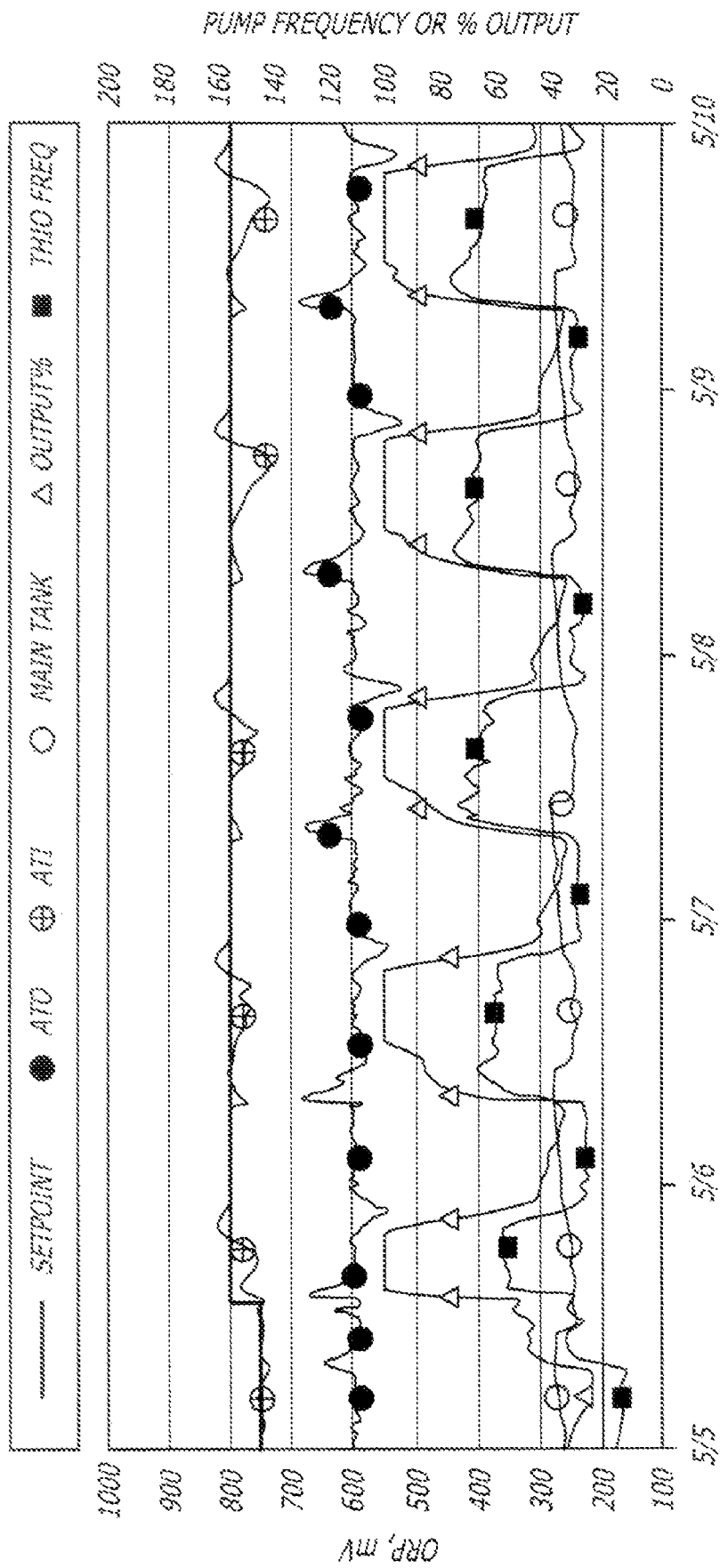
FIG. 9 is an exemplary chart depicting performance of one embodiment of the water treatment system disclosed herein.

The chart shown in FIG. 9 exemplifies performance of one embodiment of the water treatment system disclosed herein, as utilized as part of an aquarium tank/exhibit. The rate that ozone and thiosulfate are injected into the system varies based on the need for oxidizing agents or neutralizing chemicals. By allowing controllers to vary the respective injection rates, the proper oxidation-reduction potential for certain points along the process stream is maintained to coincide with pre-determined set points, as discussed above. This maintains safe levels of oxidizing agents in the water source, from which the process stream originates, and high enough levels in the process stream to achieve desired disinfection. The symbols (closed circle, circle with a cross, open circle, open triangle and closed square) are for illustrative purposes to clearly indicate the various lines in the chart. ORP in milli-volts (mV) is provided on the left hand vertical axis and pump frequency and percent ozone generator output is provided on the right hand vertical axis.

Pump frequency is generally measured as strokes per minute with a maximum rate of 100 strokes per minute. The volume flow rate of thiosulfate is generally dependent on the initial concentration of the sodium thiosulfate solution and the amount required to reduce the ORP to the ATO set point. This flow rate dynamically changes as the ozone demand in the process water fluctuates. For the current system that is described the thiosulfate flow rate could range from 0 to 350 mL/min. The "percent ozone generator output" is the actual percentage of the total watts that the ozone generator is producing to create the ozone gas. Therefore, the generator at its maximum wattage is at 100% of its ozone generating capability. For the current system that is described the maximum output of ozone is approximately 34 lbs/day or 644 grams/hour. The "percent ozone generator output" is remotely controlled by the computer controller and the PID loop. The right hand axis serves as two different axes. When looking at the "percent ozone generator output" line, the numbers on the right axis represent that percentage, "% Output", maximum is 100%. When one is looking at the "Thio Freq" data, the frequency of the thiosulfate pump(s), the axis is to be read in strokes per minute, with 100 strokes per minute as the maximum.

In this one example, the straight line in the graph of FIG. 9 represents the setpoint for the target ORP of the aeration tower inlet 20. The circle with a cross represents the actual ORP values for the Aeration Tower Inlet (ATI), 20. The solid circle represents the ORP values for the Aeration Tower Outlet (ATO). This is the controlled target ORP value resulting from the injection of the neutralizing agent. In this example, the ATO setpoint was 600 mV (not shown on the graph of FIG. 9) The ATI set point is set at 750 to 800 mV on the graph. The open circle represents the ORP values measured in the main aquarium (main tank) of the exhibit which can be considered in this instance an exemplary main reservoir 22. The open triangles represent the recorded output, in percentage, of the ozone generator, 104, as controlled by the PID loop based on the ATI setpoint and actual value. The closed square represents the recorded output of the neutralizing chemical dosage pump. The output of the pump is from 0 to 100 strokes per minute.

The uses for this technology are numerous. Cruise ships and or large ocean going vessels could use this technology to clean-up waste streams without affecting sensitive coastal environments like coral reefs. Zoos and Aquaria could treat animal environments, cleaning the water and removing harmful bacteria and viruses without causing health problems, e.g. irritated fish gills, corneal damage to sea lions and crocodiles, caused by the oxidizing chemicals.

While the above description contains many particulars, these should not be consider limitations on the scope of the invention, but rather a demonstration of embodiments thereof. The system, method and apparatus disclosed herein include any combination of the different species or embodiments disclosed. One skilled in the art would recognize that these elements should be interpreted in light of the following claims and any equivalents thereto and/or useful combinations thereof. Accordingly, it is not intended that the scope of the invention in any way be limited by the above description.

What is claimed is:

1. A method for water treatment, comprising:
providing a conduit for conducting water from a water source on board a watercraft wherein said water source includes at least one of grey water or black water;
obtaining an amount of water to be treated from said water source, said amount of water having an oxidation reduction potential;
measuring a first oxidation reduction potential of said water at a first measuring point and communicating the first oxidation reduction potential to a computer;
conducting said amount of water to at least one oxidant injection point downstream of the first measuring point;
introducing an effective amount of at least one oxidant via an oxidant dispenser and controller communicating with the computer, at said at least one oxidant injection point, to said volume of water, said oxidant injection point being located downstream of the point of measuring the first oxidation reduction potential of said water;
providing a first target oxidation reduction potential in the computer, said first target oxidation reduction potential being greater than said first oxidation reduction potential;
allowing for a first oxidation-reduction reaction to occur, said first oxidation reduction reaction proceeding between said at least one oxidant and at least one contaminant in said amount of water;
measuring a second oxidation reduction potential of said water at a point downstream of a point of commencement of said first oxidation-reduction reaction and communicating the second oxidation reduction potential to the computer;
introducing an effective amount of at least one neutralizing chemical into said water via a neutralizing chemical dispenser and controller communicating with the computer at a neutralizing chemical injection point located downstream of a point of measuring the third second oxidation reduction potential of said water, said effective amount being based upon said second oxidation reduction potential and a target effluent oxidation reduction potential provided in the computer;
allowing for a second oxidation-reduction reaction to occur, said second oxidation reduction reaction proceeding substantially between remaining said at least one oxidant and said at least one neutralizing chemical;
allowing for said target effluent oxidation reduction potential to be established in said water; and
distributing resultant treated water now having said target effluent oxidation reduction potential.

2. The method of claim 1, wherein said at least one oxidant is ozone.

3. The method of claim 2, wherein said at least one oxidant is combined with at least one additional oxidant selected from the group consisting of bromine and chlorine.

4. The method of claim 1, wherein said at least one oxidant is selected from the group consisting of bromine and chlorine.

5. The method of claim 1, wherein said at least one neutralizing chemical is sodium thiosulfate.

6. The method of claim 5, wherein said at least one neutralizing chemical is combined with at least one additional neutralizing chemical selected from the group consisting of sodium sulfite, ascorbic acid and hydrogen sulfite.

7. The method of claim 1, wherein said at least one neutralizing chemical is selected from the group consisting of sodium sulfite, ascorbic acid and hydrogen sulfite.

8. The method of claim 1, wherein said water source is a water holding apparatus that contains water collected from at least one food processing station.

9. The method of claim 8, further comprising the step of washing at least one food item at said at least one food processing station.

10. The method of claim 9, wherein said washing step results in water contamination with at least one natural bodily fluid or at least one bodily secretion.

11. The method of claim 10, wherein said at least one natural bodily fluid comprises blood.

12. The method of claim 10, said at least one natural bodily fluid comprises at least one of intracellular or interstitial fluids.

13. The method of claim 10, wherein said at least one bodily secretion includes at least one of urine, saliva, feces, and semen.

14. A method for water treatment, comprising:
providing a conduit for conducting water from a water source on board a watercraft wherein said water source includes at least one of grey water or black water;
obtaining an amount of water to be treated from said water source, said amount of water having an oxidation reduction potential;
measuring a first oxidation reduction potential of said water and communicating the first oxidation reduction potential to a computer;
conducting said amount of water to at least one oxidant injection point,
introducing an effective amount of at least one oxidant, at said at least one oxidant injection point via an injection dispenser and controller communicating with the computer, to said volume of water, said at least one oxidant injection point being located downstream of a point of measuring the first oxidation reduction potential of said water;
providing a first target oxidation reduction potential in the computer, said first target oxidation reduction potential being greater than said first oxidation reduction potential, said first target oxidation reduction potential being a predetermined sanitizing target oxidation reduction potential achieved by introduction of said effective amount of at least one oxidant;
allowing for a first oxidation-reduction reaction to occur, said first oxidation reduction reaction proceeding between said introduced at least one oxidant and at least one contaminant in said amount of water;
measuring a second oxidation reduction potential of said water at a point downstream of a point of commencement of said first oxidation-reduction reaction and communicating the second oxidation reduction potential to the computer;
introducing an effective amount of at least one neutralizing chemical into said water as determined by the computer at a neutralizing chemical injection point located downstream of a point of measuring the second oxidation reduction potential of said water, said effective amount being based upon said second oxidation reduction potential and a target effluent oxidation reduction potential;
allowing for a second oxidation-reduction reaction to occur, said second oxidation reduction reaction proceeding substantially between remaining said at least one oxidant and said at least one neutralizing chemical;
measuring a third oxidation reduction potential of said water at a point downstream of a point of commencement of said second oxidation-reduction reaction and communicating the third oxidation reduction potential to the computer;
allowing for said target effluent oxidation reduction potential to be established in said water; and
distributing resultant treated water now having said target effluent oxidation reduction potential.

15. A method for water treatment, comprising:
providing a conduit for conducting water from a water source wherein said water source includes at least one of grey water or black water;
obtaining water to be treated from said water source, said water having an oxidation reduction potential;
determining a first oxidation reduction potential of said water;
communicating the first oxidation reduction potential to a computer;
conducting said water to at least one oxidant injection point;
introducing an effective amount of at least one oxidant determined by the computer, at said at least one oxidant injection point via an injection dispenser and controller communicating with the computer, to said water, said at least one oxidant injection point being located downstream of a point of determining the first oxidation reduction potential of said water;
providing a first target oxidation reduction potential in the computer, said first target oxidation reduction potential being greater than said first oxidation reduction potential, said first target oxidation reduction potential being a predetermined sanitizing target oxidation reduction potential achieved by introduction of said effective amount of at least one oxidant into said water;
using the first target oxidation reduction potential to determine the effective amount of the at least one oxidant;
allowing for a first oxidation-reduction reaction to occur, said first oxidation reduction reaction proceeding between said introduced at least one oxidant and at least one contaminant in said water;
determining a second oxidation reduction potential of said water at a point downstream of a point of commencement of said first oxidation-reduction reaction;
communicating the second oxidation reduction potential to the computer;
introducing an effective amount of at least one neutralizing chemical into said water via an injection dispenser and controller communicating with the computer at a neutralizing chemical injection point located downstream of a point of determining the second oxidation reduction potential of said water, said effective amount being based upon said second oxidation reduction potential and a target effluent oxidizer oxidation reduction potential;
allowing for a second oxidation-reduction reaction to occur, said second oxidation reduction reaction proceeding substantially between remaining said at least one oxidant and said at least one neutralizing chemical;
allowing for said target effluent oxidation reduction potential to be established in said water;
and distributing resultant treated water now having said target effluent oxidation reduction potential.

* * * * *